April 15, 1930.  W. C. BROADWELL  1,754,258
VEHICLE CUSHIONING AND SHOCK ABSORBING DEVICE
Filed Aug. 25, 1926
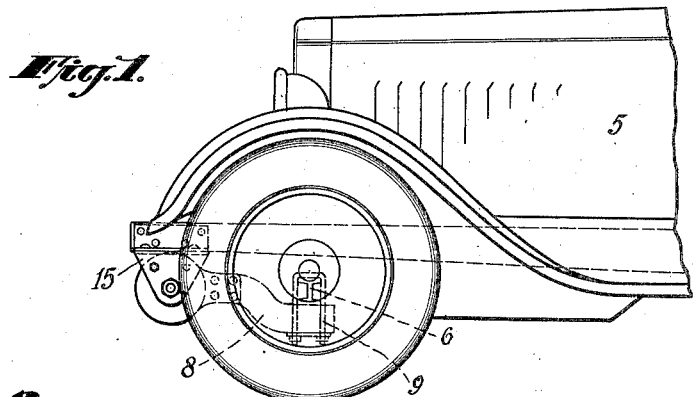
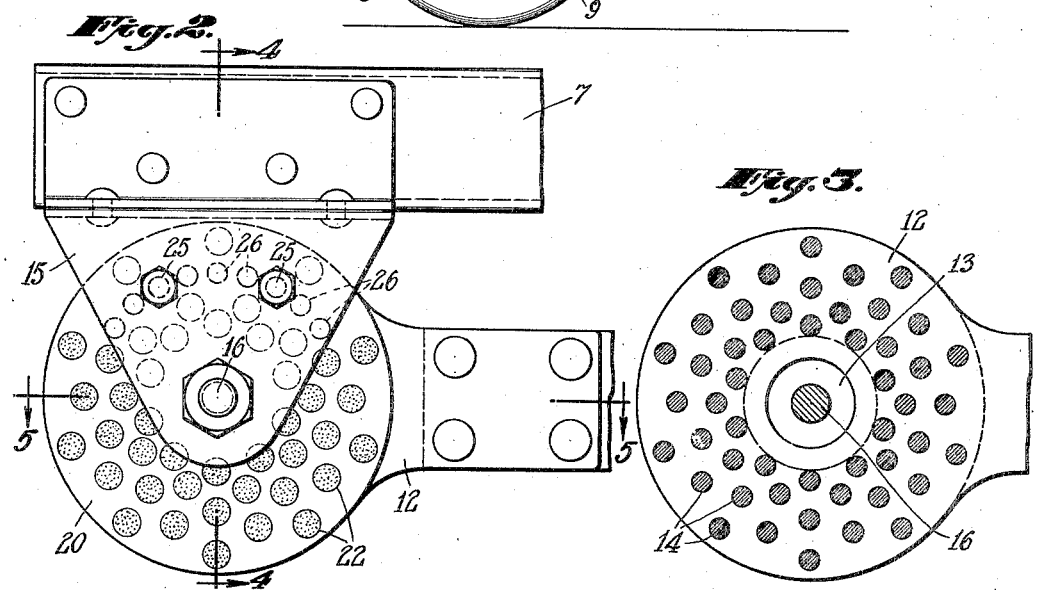
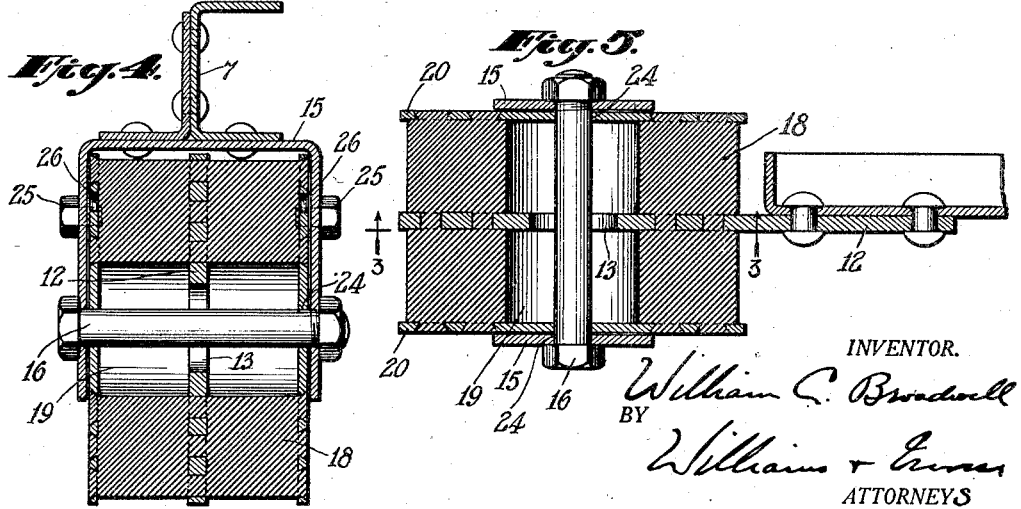
INVENTOR.
William C. Broadwell
BY
Williams + Emmer
ATTORNEYS Patented Apr. 15, 1930

1,754,258

UNITED STATES PATENT OFFICE

WILLIAM C. BROADWELL, OF BROOKLYN, NEW YORK

VEHICLE CUSHIONING AND SHOCK-ABSORBING DEVICE

Application filed August 25, 1926. Serial No. 131,318.

This invention relates to vehicle cushioning and shock absorbing devices, and is herein shown applied to an automobile.

The general object of the invention is to provide a device of the character mentioned which is simple in construction, reliable in operation, easily installed, and capable of withstanding prolonged use.

Other objects and certain advantages of the invention will become apparent from the following description when taken in connection with the accompanying drawings, in which—

Figure 1 is a view in elevation showing the device applied to an automobile.

Figure 2 is an enlarged fragmental view of the device.

Figure 3 is a sectional view taken on line 3—3 of Figure 2.

Figure 4 is a sectional view taken on line 4—4 of Figure 2.

Figure 5 is a sectional view taken on line 5—5 of Figure 2.

In practice, as many of the devices embodying the invention may be employed in connection with a vehicle as there are wheels to the vehicle. However, only one device is herein shown, it being illustrated as applied to an automobile 5, having an axle 6 and a frame 7.

The device herein shown, includes an oscillatory lever 8 which is arranged longitudinally of the frame 7 and is suitably connected at its free end to the axle 6 by means of a shackle 9. The lever 8, at its forward end, terminates in an anchor plate 12, provided centrally with a relatively large opening 13, about which are formed a plurality of relatively small openings 14.

To the forward end of the frame 7, is suitably connected a yoke-shaped support 15, through the depending legs of which passes a bolt 16, serving as means for securing a cushioning element 18, to the frame 7. This cushioning element is herein shown as a rubber ring, having a relatively large central opening 19.

In forming the cushioning element 18, the rubber is preferably molded about and vulcanized to the anchor plate 12. In molding the rubber, portions thereof enter the openings 14 and thereby key the anchor plate to the rubber in order to prevent a relative movement between opposite faces of the anchor plate and the adjacent rubber. In order to further insure against such relative movement, the rubber is vulcanized to opposite faces of the anchor plate 12.

Not only is it necessary to anchor the opposite faces of the anchor plate 12 with respect to the rubber at its point of connection with such faces, but it is also necessary to anchor opposite faces of the rubber with respect to the frame 7. To accomplish this latter anchoring, a pair of side plates are provided, each being formed with a plurality of tapered openings 22, into which portions of the rubber enter, during the molding thereof and thereby key the plates 20 to the opposite faces of the rubber. In addition to keying the cushioning element 18, to the plates 20 the rubber entering into this cushioning element is vulcanized to the side plates. These side plates 20 are formed centrally with openings 24, adapted for the reception of the bolts 16, which serves to retain the cushioning element 18 properly positioned with respect to the support 15.

In order to secure the side plates 20 to the support 15 in such a manner as to prevent movement of these plates with respect to adjacent depending legs of the yoke 15, a plurality of lag bolts 25 are provided. These lag bolts pass through opposite depending legs of the support 15 and engage screw-threaded openings 26 formed in the side plates 20, such openings 26 being arranged in arcuate groups about the axis of the bolt 16.

The lag bolts 25 and screw-threaded openings 26 constitute means by which various angular adjustments of the arm 8 may be made to accommodate vehicles of different weights. For example, in the case of a relatively heavy automobile, the cushioning element 18, together with the side plates 20, may be rotated in a clockwise direction, as viewed in Figure 2, so that the lag bolts 25 can be run down into engagement with the proper respective openings 26, appearing at the left of the lag bolts in Figure 2. On the other hand, should it be desired to employ the device in connection with a relatively light automobile, the desired adjustment of the cushioning element 18, together with the side plates 20, may be made by moving the cushioning element in a counter-clockwise direction, as viewed in Figure 2, until the proper position is assumed by the arm 8, after which the lag bolts 25 may be run down into screw-threaded engagement with the proper respective openings 26, appearing at the right of the lag bolts, as viewed in Figure 2.

By reason of the fact that opposite faces of the cushioning element 18 are anchored with respect to the frame 7, as above described, and since opposite faces of the anchor plate 12 are anchored with respect to the adjacent portions of the cushioning element, it follows that upon oscillation of the arm 8, the rubber entering into the cushioning element 18 is subjected to strains and stresses intermediate the anchor plate 12 and the side plates 20. Due to the stresses thus set up in the cushioning element 18, an efficient and effective cushioning means is provided to absorb and relieve the vehicle of excessive shocks when the axle of the vehicle is suddenly moved toward the frame of the vehicle. Furthermore, any slight radial movement of the forward end of the lever 8, with respect to the bolt 16, that might be occasioned during operation of the automobile will be accommodated due to the presence of the relatively large opening 13 in the anchor plate 12, through which the bolt 16 passes. Not only does the device herein shown, permit both oscillatory and radial movement of the arm 8, with respect to the bolt 16, but it also permits the arm 8 to respond to such torsional or other strains as are imparted thereto without unduly straining the various co-operative elements of the device when, for example, only one wheel of a given axle passes over an obstruction.

From an analysis of the structure, whereby the forward end of the lever 8 is connected to the frame 7, it will be appreciated that such a connection will afford universal movement of the forward end of the lever with respect to the frame 7. Furthermore, it will be appreciated that since every point on opposite faces of the anchor plate 12 is anchored to the contacting rubber, and since every point throughout the area of opposite ends of the rubber is connected to the side plates 20, all rubber confined between the anchor plate 12 and the side plates 20, is utilized to resist all movement of the forward end of the lever 8 with respect to the frame 7.

Having thus described the invention, what is claimed is:

1. In a cushioning device for a vehicle having an axle and a frame, a cushioning element of yieldable material having at least one of its faces anchored with respect to said frame, and an oscillatory lever universally connected to said frame through said cushioning element and having at one end a face-to-face union with said cushioning element and connected at its other end to said axle.

2. In a cushioning device for a vehicle having an axle and a frame, a cushioning element of yieldable material, means for anchoring at least one face of said cushioning element against movement with respect to said frame, and an oscillatory lever connected at one end to said axle and having its other end in face-to-face union with said cushioning element and universally connected to said frame through said cushioning element.

3. In a cushioning device for a vehicle having an axle and a frame, a cushioning element of yieldable material having opposite faces anchored with respect to said frame, and an oscillatory lever connected at one end to said axle and having its other end confined intermediate portions of said yieldable material and connected thereto.

4. In a cushioning device for a vehicle having an axle and a frame, a cushioning element of yieldable material having its opposite faces anchored with respect to said frame, and an oscillatory lever connected at one end to said axle and having its other end embedded in and connected to said rubber intermediate said faces thereof.

5. In a cushioning device for a vehicle having an axle and a frame, a cushioning element of yieldable material, means for anchoring opposite faces of said cushioning element against movement with respect to said frame, an oscillatory lever connected at one end to said axle and having its other end confined intermediate portions of said yieldable material and united therewith.

6. In a cushioning device for a vehicle having an axle and a frame, a tubular cushioning element of yieldable material having its opposite ends anchored with respect to said frame, and an oscillatory lever connected at one end to said axle and terminating at its other end in an anchor plate, said anchor plate being confined intermediate portions of said yieldable material and anchored thereto.

7. In a cushioning device for a vehicle having an axle and a frame, a cushioning element of yieldable material, side plates secured to opposite faces of said cushioning element, means for securing said plates to said frame, and an oscillatory lever connected at one end to said axle and having its other end confined intermediate portions of said yieldable material and connected thereto.

8. In a cushioning device for a vehicle having an axle and a frame, a cushioning element of yieldable material, side plates secured to opposite faces of said cushioning element, means for securing said plates to said frame, and an oscillatory lever connected at one end to said axle and terminating at its other end in a perforated anchor plate confined intermediate said side plates, adjacent portions of said yieldable material projecting into the perforations of said anchor plate.

9. In a cushioning device for a vehicle having an axle and a frame, a cushioning element of yieldable material, side plates secured to opposite faces of said cushioning element, a yoke connected to said frame, means for adjustably connecting said side plates to said yoke, means for locking said side plates in a given adjusted position, an oscillatory lever connected at one end to said axle and having its other end confined intermediate portions of said cushioning element and connected thereto.

10. In a cushioning device for a vehicle having an axle and a frame, a cushioning element of yieldable material, side plates secured to opposite faces of said cushioning element, a yoke connected to said frame, means for adjustably connecting said side plates to said yoke, means for locking said side plates in a given adjusted position, an oscillatory lever connected at one end to said axle and having its other end terminating in a perforated anchor plate arranged intermediate said side plates, adjacent portions of said yieldable material projecting into the perforations of said anchor plate whereby said lever is anchored to said yieldable material.

In testimony whereof, I have affixed my signature to this specification.

WILLIAM C. BROADWELL.